(12) United States Patent
Conville et al.

(10) Patent No.: US 11,107,136 B2
(45) Date of Patent: Aug. 31, 2021

(54) MANAGEMENT OF PRODUCTS AND DYNAMIC PRICE DISPLAY SYSTEM

(71) Applicants: Brian Conville, San Jose, CA (US); Dermot P. Mee, San Jose, CA (US)

(72) Inventors: Brian Conville, San Jose, CA (US); Dermot P. Mee, San Jose, CA (US)

( * ) Notice: Subject to any disclaimer, the term of this patent is extended or adjusted under 35 U.S.C. 154(b) by 326 days.

(21) Appl. No.: 15/791,236

(22) Filed: Oct. 23, 2017

(65) Prior Publication Data

US 2018/0114257 A1 Apr. 26, 2018

Related U.S. Application Data

(60) Provisional application No. 62/411,459, filed on Oct. 21, 2016.

(51) Int. Cl.
*G06Q 10/00* (2012.01)
*G06Q 30/02* (2012.01)

(52) U.S. Cl.
CPC .................... *G06Q 30/0283* (2013.01)

(58) Field of Classification Search
None
See application file for complete search history.

(56) References Cited

U.S. PATENT DOCUMENTS

| | | | |
|---|---|---|---|
| 4,766,295 A | 8/1988 | Davis et al. | |
| 5,537,126 A | 7/1996 | Kayser et al. | |
| 5,537,312 A | 7/1996 | Sekiguchi et al. | |
| 5,736,967 A | 4/1998 | Kayser et al. | |
| 6,089,453 A | 7/2000 | Kayser et al. | |
| 6,249,263 B1 | 6/2001 | Kayser et al. | |
| 6,253,190 B1 | 6/2001 | Sutherland | |
| 6,266,052 B1 | 7/2001 | Kayser et al. | |

(Continued)

FOREIGN PATENT DOCUMENTS

GB 2371176 A 7/2002

OTHER PUBLICATIONS

Rigby, Darrell, The Future of Shopping, Dec. 2011, Harvard Business Review, https://hbr.org/2011/12/the-future-of-shopping, p. 1-19. (Year: 2011).*

(Continued)

*Primary Examiner* — Joseph M Waesco
(74) *Attorney, Agent, or Firm* — Zilka-Kotab, P.C.

(57) ABSTRACT

A computer-implemented method according to one embodiment includes receiving prices from a remote site, e.g., a headquarter location; and sending the prices to a plurality of locations, e.g., store locations, with an instruction to output the prices on displays of display units. A computer-implemented method according to another embodiment includes receiving prices from a remote site, e.g., a headquarter location; and instructing display units at a location to output the prices on displays thereof. A computer-implemented method according to one embodiment includes receiving product information by scanning products to generate a check out list for automatic checkout using stored customer financial information. A computer implemented method according to one embodiment includes receiving bundled promotional offers from vendors for products based on buying behaviors captured by a mobile application running on a mobile device of a user; and displaying promotional offer on the mobile device.

21 Claims, 9 Drawing Sheets

(56) References Cited

U.S. PATENT DOCUMENTS

| | | | |
|---|---|---|---|
| 6,271,807 B1 | 8/2001 | Kayser et al. | |
| 6,703,934 B1 | 3/2004 | Nijman et al. | |
| 6,844,821 B2 | 1/2005 | Swartzel et al. | |
| 7,523,047 B1* | 4/2009 | Neal | G06Q 30/0206 705/7.35 |
| 7,657,227 B2 | 2/2010 | Doan et al. | |
| RE41,701 E | 9/2010 | Domnitz | |
| 7,792,710 B2 | 9/2010 | Bonner et al. | |
| 7,853,477 B2 | 12/2010 | O'Shea et al. | |
| 7,970,389 B2 | 6/2011 | Ramer et al. | |
| 8,061,600 B2 | 11/2011 | Goel et al. | |
| 8,070,062 B2 | 12/2011 | Goel et al. | |
| 8,260,666 B2* | 9/2012 | Kaliboukis | G06Q 20/208 705/14.53 |
| 2001/0051901 A1 | 12/2001 | Ager et al. | |
| 2002/0174025 A1 | 11/2002 | Hind et al. | |
| 2003/0115096 A1 | 6/2003 | Reynolds et al. | |
| 2004/0107170 A1 | 6/2004 | Labrou et al. | |
| 2005/0149414 A1 | 7/2005 | Schrodt et al. | |
| 2005/0256786 A1 | 11/2005 | Sands et al. | |
| 2006/0163349 A1 | 7/2006 | Neugebauer | |
| 2007/0112647 A1* | 5/2007 | Borders | G06Q 30/0633 705/7.35 |
| 2008/0052168 A1 | 2/2008 | Peters et al. | |
| 2008/0067244 A1 | 3/2008 | Marks | |
| 2008/0243626 A1 | 10/2008 | Stawar et al. | |
| 2008/0306830 A1* | 12/2008 | Lasa | G06Q 30/02 705/14.16 |
| 2009/0119013 A1* | 5/2009 | O'Malley | G06Q 20/203 701/431 |
| 2009/0182623 A1 | 7/2009 | Baltimore | |
| 2009/0248532 A1 | 10/2009 | Sugiura | |
| 2009/0281888 A1 | 11/2009 | Jai et al. | |
| 2010/0125492 A1 | 5/2010 | Lin et al. | |
| 2010/0167704 A1 | 7/2010 | Villemaire | |
| 2011/0191432 A1 | 8/2011 | Layson, Jr. | |
| 2011/0240731 A1 | 10/2011 | Lee et al. | |
| 2011/0311164 A1 | 12/2011 | Badharudeen et al. | |
| 2013/0080289 A1* | 3/2013 | Roy | G06Q 20/204 705/26.8 |
| 2013/0173402 A1* | 7/2013 | Young | G06Q 30/0631 705/14.73 |
| 2013/0290172 A1* | 10/2013 | Mashinsky | G06Q 20/384 705/39 |
| 2014/0156461 A1* | 6/2014 | Lerner | G06Q 30/0635 705/26.61 |
| 2014/0195304 A1* | 7/2014 | Stein | G06Q 30/0206 705/7.35 |
| 2014/0324627 A1* | 10/2014 | Haver | G06Q 30/0273 705/26.9 |
| 2015/0228004 A1* | 8/2015 | Bednarek | G06Q 10/08355 705/26.8 |
| 2015/0356569 A1* | 12/2015 | O'Malley | G07F 9/002 705/304 |
| 2016/0012465 A1* | 1/2016 | Sharp | G06Q 20/386 705/14.17 |
| 2016/0055562 A1* | 2/2016 | Kim | G09G 5/12 705/26.61 |
| 2016/0267541 A1* | 9/2016 | Breakey | G06Q 30/02 |
| 2017/0032422 A1* | 2/2017 | Pinkus | G06Q 30/0265 |
| 2017/0076408 A1* | 3/2017 | D'Souza | G06Q 40/00 |
| 2018/0053241 A1* | 2/2018 | Haver | G06Q 30/0207 |

OTHER PUBLICATIONS

QED Factory, "Electronic Shelf Label (ESL) System," QED Factory Display Solutions, May 2012, 2 pages, retrieved on Aug. 5, 2019 from https://web.archive.org/web/20120501135820/http://qedfactory.com/esl.html.

Marginmate, "Electronic Price Displays," MarginMate Electronic Price Displays, accessed on Aug. 5, 2019, 2 pages, retrieved from http://www.marginmate.com/shelfedgedisplays.php.

Media 2000 Systems, "Retail Digital Signage Solution," Media 200 Systems, accessed on Aug. 5, 2019, 3 pages, retrieved from https://www.m2ksys.com/documents/retail_digital_signage_solution.html.

Altierre, "Market to the shopper, in the aisle," Altierre Corporation, 2019, 5 pages, retrieved from https://www.altierre.com/.

Heimbuch, J., "Going Paperless Isn't Always Green, Supermarkets Swapping Price Tags for LCDs," Treehugger, Feb. 20, 2009, 13 pages, retrieved from https://www.treehugger.com/clean-technology/going-paperless-isnt-always-green-supermarkets-swapping-price-tags-for-lcds.html.

Brill, L., "Oasis of the Sea: Digital Signage Takes a Cruise to Wayfinding," Signindustry.com, 2019, 6 pages, retrieved Aug. 5, 2019, from http://www.signindustry.com/electronic/articles/2011-07-01-LB-Oasis-of-the-Seas-Digital-Signage-Wayfinding.php3.

Crystalfontz, "Crystalfontz America," May 2012, 2 pages, retrieved on Aug. 12, 2019, from http://web/archive.org/web/20120503232146/https://www.crystalfontz.com/.

Amazon, "MVS 780RG Programmable Sign," Amazon, 2012, 5 pages, retrieved on Aug. 20, 2019, from https://www.amazon.com/Millenium-MVS-780RG-Programmable-Sign/dp/B000VIHIQK/ref=smi_www_rco2_go_smi_g39057079227_encoding=UTF8&%2AVersion%2A=1&%2Aentries%2A=0&ie=UTF8&pldnSite=1.

* cited by examiner

MANAGEMENT OF PRODUCTS AND DYNAMIC PRICE DISPLAY SYSTEM

RELATED APPLICATIONS

This application claims priority to Provisional U.S. Patent Appl. No. 62/411,459 filed Oct. 21, 2016, which is herein incorporated by reference.

FIELD OF THE INVENTION

The present invention relates to product management, and more particularly, this invention relates to the interaction between corporate entities, stores and/or customers with respect to the management of products, dynamic pricing display changes, product relevance and/or product promotion.

BACKGROUND

Stores, especially supermarkets, have traditionally been disjointed in terms of how they present, suggest, recommend, reward loyalty, and display pricing for the products and services they provide. For instance, a supermarket may use paper labels to identify items for sale, club card savings for loyalty, and an App with savings and customer preference tracking, but these pieces are kept separate.

Existing systems are also unable to change the price of items displayed in stores sufficiently quickly, even if shipments of materials are able to arrive at any desired time. This causes delay of information and slows business considerably. For example, if a parent company buys in bulk to save money on a given product, that product can only be distributed to stores that have a lack of that product, otherwise advertised pricing may not be able to adjust quickly enough in the store. Slow adjustment of pricing causes clashes to occur in view of the time sensitive nature of some perishable items (e.g., food). Due to this, corporations miss out on large savings as they are unable to expel products fast enough with a beneficial sale because the pricing available does not properly represent the value of the products, and cannot be changed to do so quickly.

A similar issue experienced by existing systems stems from the use of paper pricing labels in their stores. These paper labels have a high cost associated therewith, and require a significant amount of labor to implement and update in the store. Printing these paper labels is also expensive. Currently, product pricing is determined at the corporate level and transmitted to the store locations, which is then printed out on paper labels (e.g., at the store). The paper labels are then physically placed on the shelf at each corresponding item. However, with price changes occurring frequently the result is that the existing model becomes significantly more costly.

SUMMARY

A computer-implemented method according to one embodiment includes receiving prices from a remote site, e.g., a headquarter location; and sending the prices to a plurality of locations, e.g., store locations, with an instruction to output the prices on displays of display units.

The method may include sending, for a product, at least one additional piece of information for output on the displays of the display devices, the at least one additional piece of information being selected from the group consisting of a name, size, a corresponding SKU number, special offers corresponding to the product, a scan code, measurements, sale flags, address, and unit identification (ID).

The method may include receiving a notification of relocation of one of the display units; determining a new location of the display unit; selecting a new price based on the new location; and sending the new price to the relocated display unit with an instruction to output the new price.

The method may include receiving from the plurality of locations inventory information about products at the plurality of locations; sending the inventory information to vendors of the products; receiving from the vendors content for outputting on displays of the display units; and sending the content to the plurality of locations with an instruction to output the content on displays of display units.

The method may include receiving from the plurality of locations inventory information about products at the plurality of locations; sending the inventory information to the remote site e.g., for inventory, restocking, and buying decisions.

The method may include receiving from the plurality of locations inventory information about a product at the plurality of locations; selecting a price for the product at each location individually based on the inventory information; and sending the selected prices to each respective location with an instruction to output the respective selected price on displays of display units at the respective locations.

The method may include receiving from the plurality of locations demographics information about customers visiting the plurality of locations; setting a price for a product at one of the locations differently than a price for the same product at a different one of the locations based on the demographics information; and sending the set prices to the respective location with an instruction to output the respective price on displays of display units at the respective locations. In one approach, the prices are changed on a temporal basis based on the demographics information. In another approach, the prices are changed on a temporal basis based on a predefined daily schedule.

The method may include receiving from the plurality of locations demographics information about customers visiting the plurality of locations; selecting advertisements for each of the locations individually based on the demographics information; and sending the advertisements to the respective locations with an instruction to output the respective advertisements on displays of display units at the respective locations.

The method may include compiling inventory information about products at each of the locations; sending the inventory information to the remote site; receiving content from the remote site for outputting on displays of the mobile units; and sending the content to the plurality of locations with an instruction to output the content on displays of the display units.

The method may include receiving information from a mobile application running on a mobile device of a customer; selecting an advertisement for the user based on the received information; and sending the advertisement to the mobile application for output on a display of the mobile device.

A computer-implemented method according to another embodiment includes receiving prices from a remote site, e.g., a headquarter location; and instructing display units at a location to output the prices on displays thereof.

The method may include compiling inventory information about products at the location; sending the inventory information to vendors of the products; receiving from the vendors content for outputting on displays of the display units; and sending the content to the plurality of locations with an instruction to output the content on displays of display units.

The method may include detecting relocation of one of the display units; sending a notification of the relocation; receiving a new price from the remote site; and sending the new price to the relocated display unit with an instruction to output the new price.

The method may include sending demographics information to the remote site.

The method may include receiving identification of products from a mobile application running on a mobile device of a user; generating a list of the identified products; and sending the list to the mobile device for output thereon.

The method may include receiving identification of products from a mobile application running on a mobile device of a user; and updating an inventory to remove the identified products from the inventory in response to receiving the identification of the products and product is placed in customers cart in preparation for automated checkout.

A computer-implemented method according to one embodiment includes receiving product information by scanning products to generate a check out list for automatic checkout using stored customer financial information.

A computer implemented method according to one embodiment includes receiving bundled promotional offers from vendors for products based on buying behaviors captured by a mobile application running on a mobile device of a user; and displaying promotional offer on the mobile device.

A display unit-implemented method according to one embodiment includes receiving, at a display unit, a price via a network; outputting the price on a display of the display unit; detecting relocation of the display unit; sending a notification of the relocation; receiving another price via the network.

Other aspects of the present invention will become apparent from the following detailed description, which, when taken in conjunction with the drawings, illustrate by way of example the principles of the invention.

Moreover, the various features described in this section may be combined in any way with other features described in this section and/or with other features described in the following Detailed Description to create a plethora of embodiments falling within the scope of the present disclosure.

DETAILED DESCRIPTION

Figure 1:
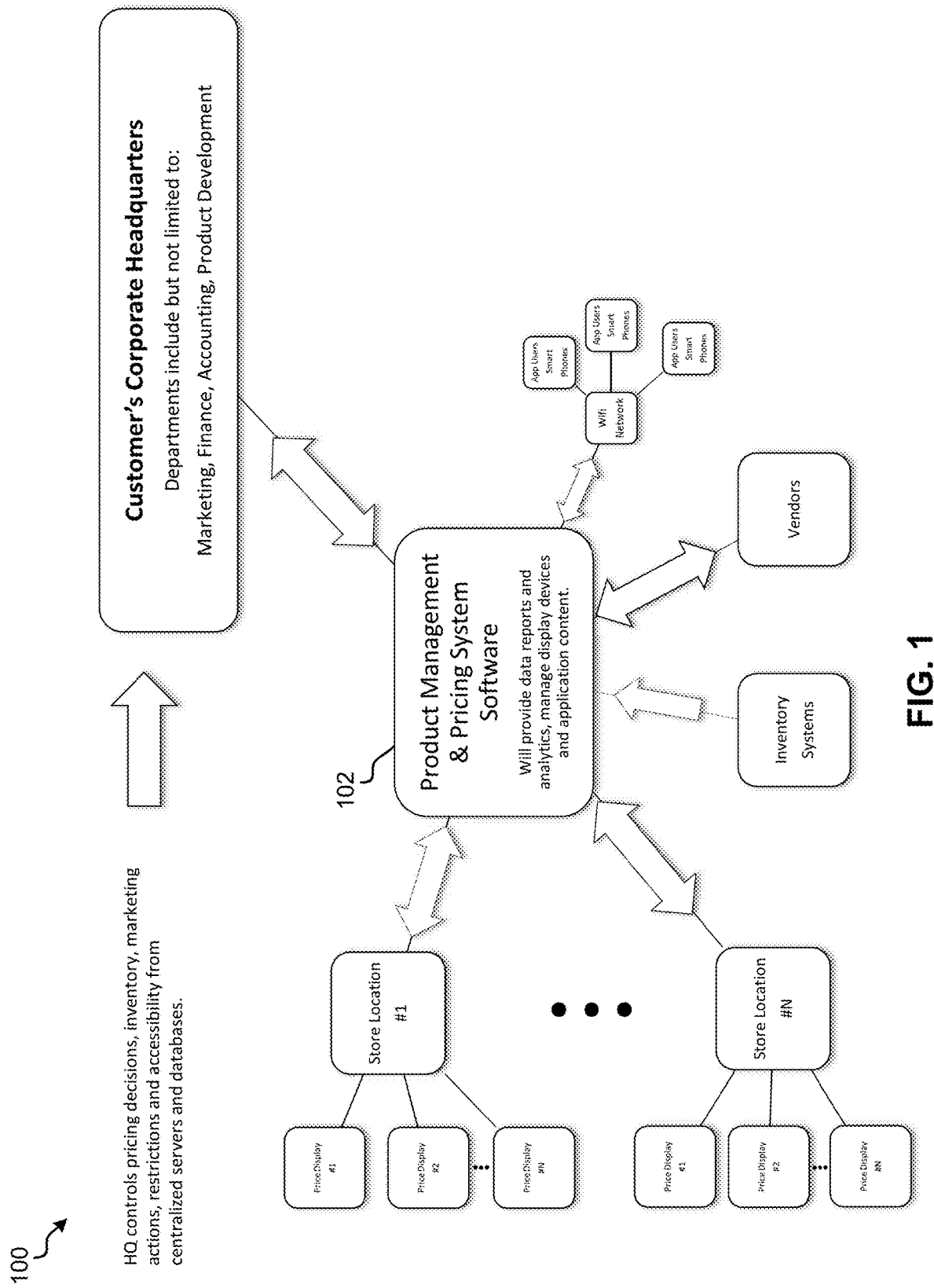
FIG. 1 is a partial representational view of a dynamic pricing network architecture according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of product management and/or related systems and methods. Various embodiments described herein deal with the interaction between corporate entities, stores and customers with respect to the management of products, as will be described in further detail below.

As previously mentioned, supermarkets and other stores have traditionally been disjointed in terms of how they present, suggest, recommend, reward loyalty, and display pricing for the products and services they provide. For instance, a supermarket may use paper labels to identify items for sale, club card savings for loyalty, and an App with savings and customer preference tracking, but these pieces are kept separate.

In sharp contrast, various embodiments described herein are able to not only display prices more effectively, but also include the ability to track an inventory. By tracking inventory and/or the handling of inventory, and then being able to feed back that data which identifies what is happening with the inventory and how that relates to different customers, various embodiments herein introduce an improved system. As a result, an ecosystem having the customer in the center of it is made possible in some approaches, as will be described in further detail below.

Moreover, added functionality may be achieved using various embodiments described herein. For example, a program may be implemented which is able to recognize a pattern associated with a customer buying a specific brand of a product. Moreover, when a different brand of the same product is on sale, the program may inform the customer of the alternative option. Thus, another way of interacting with customer is introduced in the approaches herein while also being integrated with the same (common) overall system. This may be achieved by using an App that customers are interacting with on their phone. Further integration may be achieved by interacting with devices that are placed throughout the store which collect pricing information, customer habits, patterns, paths, etc. According to an example, which is in no way intended to limit the invention, when a customer enters a store, an App previously downloaded to their phone may connect with the store's network and/or devices, whereby the App may interact with the customer's actions (movements). In some approaches, the App may even be able to interact with the store environment, thereby providing the customer with additional information, e.g., using an augmented reality through the customer's electronic device which is running the App. According to an example, a customer may approach a bottle of salsa and raise their mobile phone up so that the camera is capturing the bottle, label, product tag on the shelf, etc., and use information gathered there from to indicate a sale price, promotional deal, product inventory, similar products, etc., using the augmented reality on the mobile phone screen.

FIG. 1 illustrates an overview of an exemplary dynamic pricing network architecture 100 which may be implemented in accordance with one embodiment. As an option, the present network architecture 100 may be implemented in conjunction with features from any other embodiment listed herein, such as those described with reference to the other FIGS. For instance, portions of network architecture 100 may be implemented as a product management system and/or portion thereof. However, such network architecture 100 and others presented herein may be used in various applications and/or in permutations which may or may not be specifically described in the illustrative embodiments listed herein. Further, the network architecture 100 presented herein may be used in any desired environment. Thus FIG. 1 (and the other FIGS.) may be deemed to include any possible permutation.

As shown, the network architecture 100 includes a central computer 102 which may be used to connect a corporate location (e.g., "Customer's Corporate Headquarters") with one or more store locations (e.g., "Store Location #1" through "Store Location #N"). Moreover, inventory systems, vendors and a network may be in communication with the central computer. For example, the central computer may be connected to one or more networks, e.g., the Internet, a WiFi network, mobile network, etc. which provides a medium for data to be transferred between the central computer and applications ("apps") on a plurality of users' smart phones which are also connected to the network. The large arrows in FIG. 1 may represent the flow of information (e.g., data) according to one approach.

As shown, the central computer may also be used to run (e.g., operate) product management and pricing system software which may provide data and analytics, manage display devices, manage app content, etc., depending on the desired approach. Moreover, a plurality of at least partially electronic display units (e.g., "Price Display #1" through "Price Display #N") at one or more of the store locations may also be included in (e.g., connected to) the network architecture. Thus, information sent from the corporate location and/or store locations may be presented on the display units, e.g., as will be described in further detail below.

A headquarter location may control pricing decisions, inventory, marketing actions, restrictions and accessibility from centralized servers and databases, etc. Moreover, pricing updates, changes, restrictions, etc. may be entered by licensed users into the "Product Management & Pricing System" software. According to some approaches, this software may reside on, be hosted, or stand-alone on servers included in the system. Two-way data transmission and reporting may also be accessed. In addition, loyalty and marketing incentives from vendors may be reflected in pricing updates sent to the user.

Pricing related data may be transmitted from headquarters to the individual store locations from the "Product Management & Pricing System" software via the internet or other secure connected network. Also, customers with an application enabled on their mobile device may interact with features, information, and content delivered from the Product Management & Pricing System.

An in-store Product Management & Pricing System Wifi hub may communicate with shelf and end-cap in-store displays. Store level employees may also be responsible for stocking shelves, maintaining locations, and appearance of products and pricing displays. Store level employees responsible for inventory may update the current inventory systems that will be configured to supply data back into the Product Management & Pricing system. Furthermore, vendors granted access will be able to generate reports and provide content into the Product Management & Pricing System to offer incentives and drive customer loyalty. The content may then be sent to the plurality of locations with an instruction to output the content on displays of display units.

According to various approaches, the information sent from the corporate location and/or store locations may include product information including, but not limited to, name, size, a corresponding SKU number, price, special offers corresponding to the product, a scan code, measurements, sale flags, address, unit identification (ID), etc. Moreover, changes to any of the information may be sent as updates to a store database, display unit, etc.

Each of the display units themselves preferably present different elements associated with a corresponding product. However, the amount of product information that may be shown on the display unit may be limited. Thus, displaying certain information such as a size of the product may be less desirable (e.g., important) than a SKU number, price, bar code, sale flag(s), a corresponding store number, etc., depending on the product. Moreover, it may be desirable to identify the product itself, e.g., for management purposes such as locating the product in the store.

The display is also preferably interchangeable. For example, if a display unit is taken from one aisle in a supermarket and placed in another aisle in the same supermarket, the display unit preferably detects that it has been relocated to the new aisle, shelf, etc. In some approaches, the display unit, the store location and/or central computer may detect that a given display unit has been relocated thereby invalidating the information currently presented on the display unit. For example, the display unit may send a notification that it has been moved. In response, instructions may be generated by any of the components described herein for a different arrangement of information (e.g., data) to be presented on the display device which preferably corresponds to the new location that the display device is located, e.g., to the new product located therebehind. Accordingly, adjustments to the information may be made, e.g., to display information corresponding to products on the new aisle. According to some approaches, this functionality may be applied to embodiments having inventory control in rooms. Thus, the display units may know which room they are located in, and therefore may not display anything that is not associated with that room.

According to some approaches, sim or mapping function of a given location may be applied for each display unit. By limiting the information displayed on a given display unit, the chatter on an associated network may be reduced as the amount of available information is reduced.

In one approach, this functionality may be achieved by implementing a short-range network. For example, a local wireless network may be used to map a defined store. Thus, a display unit may be able to determine that it is located between two items, thereby informing it that it is in a given network and/or located in a given area of the store.

In further approaches, known triangulation techniques may be used. Other approaches may use near field communications.

According to an in-use example of the product management system overview illustrated in the embodiment of FIG. 1, the dynamic pricing network architecture 100 may include a corporate grocery store or chain. As such, someone at the corporate headquarter location may set the prices for various products, which may then be uploaded in the system (e.g., to the central computer) to include deals available this week, and thereby transmitted to store locations. Moreover, the store locations may be communicating with the corporate location(s), and receiving the store data therefrom. Specifically, the store locations may be receiving display data and periodically checking for and/or receiving updates from the corporate location(s). Thus, store locations may check back with the corporate database in order to determine if any display information has changed, inventory has changed, sale prices have changed, etc. Moreover, the frequency at which store locations check for updates may vary, e.g., depending on a previous and/or expected frequency of change. For example, display information may change once every few weeks for some stores, while it may change once a day for others. Thus, according to various embodiments, controllers at the store location and/or the display units themselves may check for product information updates once every few seconds, once every few minutes, once every few hours, once every few days, once every few weeks, etc. Moreover, the frequency with which updates are checked for may change over time, upon user input, etc.

According to another in-use example, individual display units may be associated with a number of products that are available in a number of different stores for a given geographical region. Thus, product shipments may be effectively directed for delivery based on sales and/or inventory in the number of different stores which may be more readily available with the integration of display units and their improved functionality as described herein. Product shipments may also be directed at the server level, e.g., using information gathered from various display units in communication therewith. This may be performed by having a server repeatedly contact display units and receive updates as to the status of the product(s) associated therewith, such as an updated inventory. A server may also send status information to display units for them to display, such as price changes and product updates. The frequency at which information may be sent between the display units and server may vary, e.g., as described above.

Figure 2:
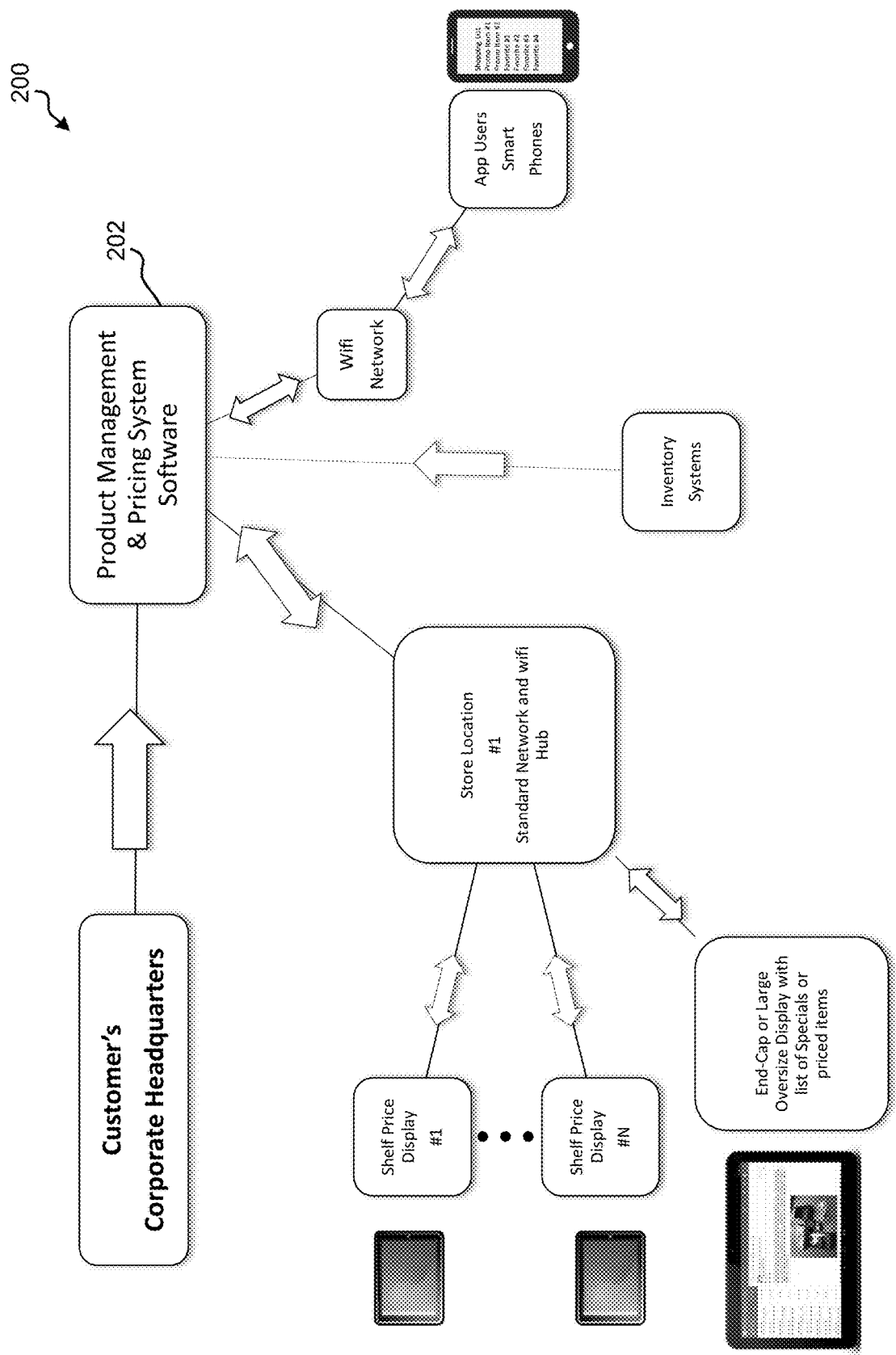
FIG. 2 is a partial representational view of a system according to one embodiment.

Connection between the store locations and the corporate location may be made using a local network, a cloud based network, an internet connection, etc. Looking to FIG. 2 a system 200 implementing a Store Pricing network is shown in accordance with another embodiment. As an option, the present system 200 may be implemented in conjunction with features from any other embodiment listed herein, such as those described with reference to the other FIGS. However, such system 200 and others presented herein may be used in various applications and/or in permutations which may or may not be specifically described in the illustrative embodiments listed herein. Further, the system 200 presented herein may be used in any desired environment. Thus FIG. 2 (and the other FIGS.) may be deemed to include any possible permutation System 200 shows a corporate location "Customer's Corporate Headquarters" in connection with display units at a store location "Store Location #1", through a computer 202 implementing "Product Management & Pricing System Software". The computer 202 may be a central computer communicating with a plurality of store locations, or a computer dedicated to a single store location. As shown, a display unit may be a display unit positioned on a given shelf at the store location adjacent a product (e.g., see "Shelf Price Display #1" through "Shelf Price Display #N") or a display unit positioned at a more central location such as the end of a given shelf or aisle at the store location (e.g., see "End-Cap or Large Oversized Display"). The End-Cap or Large Oversized Display may include a display that is larger than that of an individual shelf display, e.g., such that more product information may be displayed and/or the product information displayed is more easily readable for a user (shopper).

Pricing updates, changes, restrictions that are entered by licensed users into the Product Management & Pricing System software, etc. may be transmitted in real-time and/or on a scheduled basis to the intended displays for each product, e.g., based on a predefined daily schedule. In-store product management & pricing system Wifi hubs may communicate with shelf and end-cap in-store displays.

Store level employees responsible for inventory may update the current inventory systems that will be configured to supply data back into the Product Management & Pricing system. Moreover, store level employees will be responsible for stocking shelves maintaining location and appearance of products and pricing displays. The interactive App may also provide dynamic individualized pricing and capture buying behaviors and feed that info back into the Product Management & Pricing system.

The corporate location and display unit may be connected over an internet connection as would be appreciated by one skilled in the art upon reading the present description. For example, in one approach the thick arrows extending between the central controller 202 and the various other locations in system 200 may represent internet connections therebetween. Moreover, mobile phones may also be connected to the central computer at least in part over an internet connection, e.g., a Wifi Network, and may receive information from the central computer through an application according to one approach. Packets of information (data) may be sent from the corporate location to an in-store controller (at the store location) which may be used to manage the display units and/or the display units themselves. The packets of information may specify what information should be shown on the display units and/or specific display units. Upon receiving data from the corporate location, a display unit may display the specified information. Moreover, the display unit may store the received information and/or additional information (e.g., such as an inventory of a corresponding product). Thus, if the display unit loses power, it may retain the received and/or gathered information. Display units also preferably check to see if any updates have been received from the corporate location which may affect the information being shown and/or collected. Accordingly, FIG. 2 includes an exemplary in-store product management and price display system.

Figure 3A:
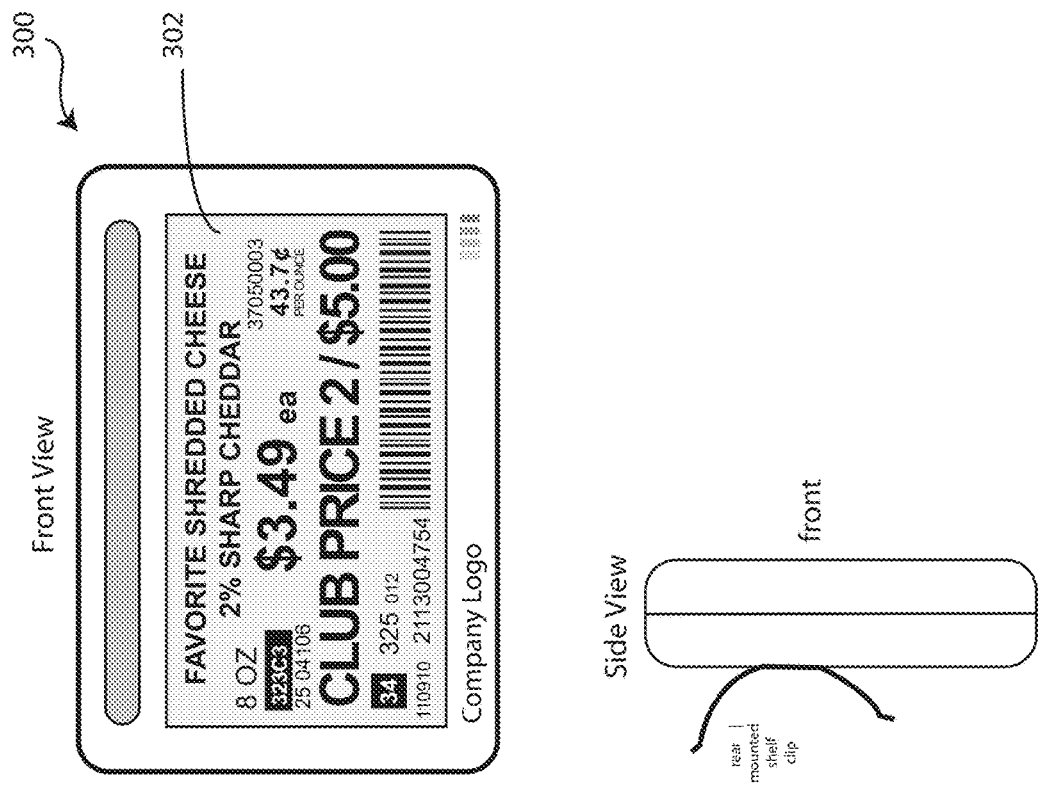
FIG. 3A is a front and side view of a display unit according to one embodiment.
Figure 3B:
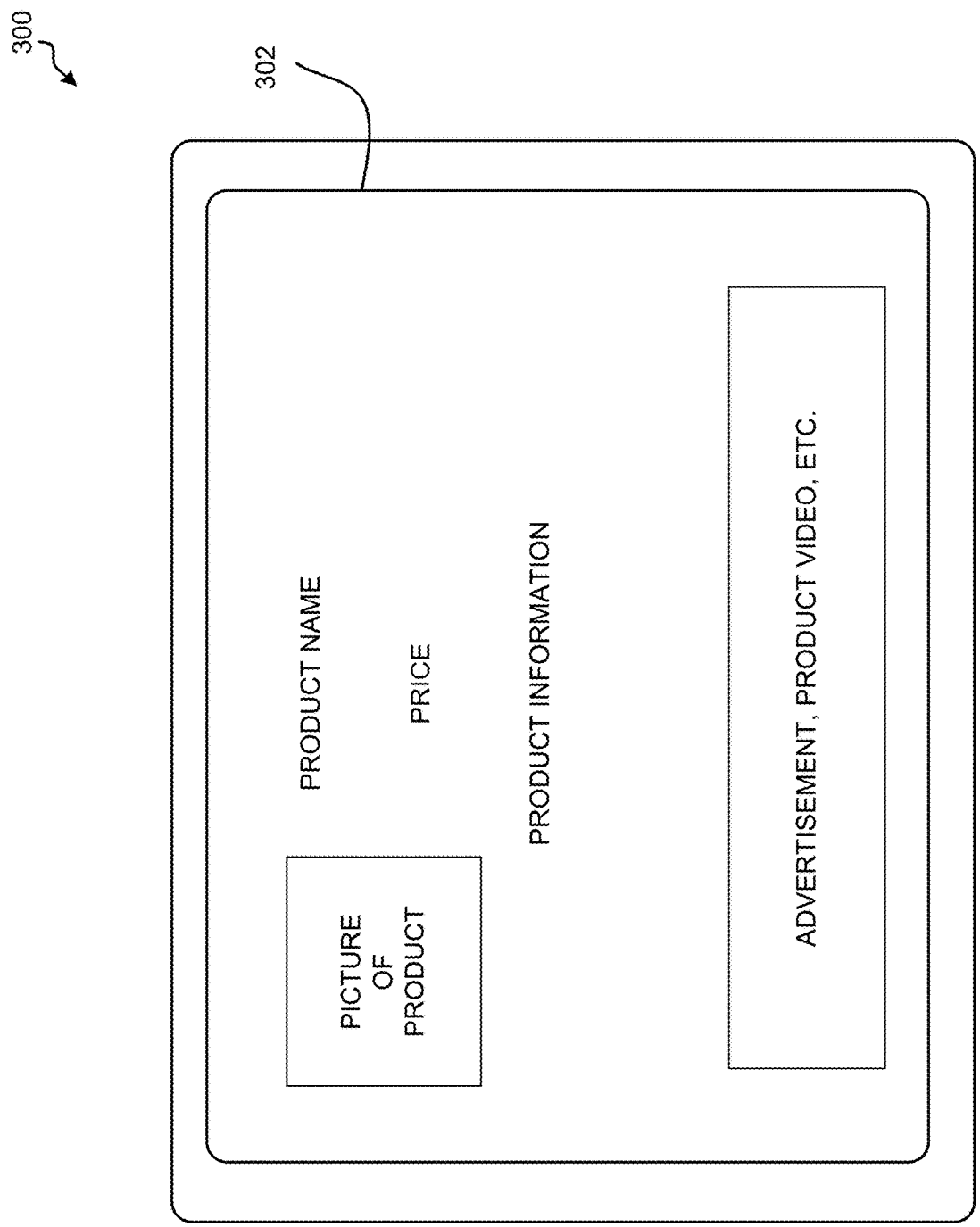
FIG. 3B is a side view of a display unit according to another embodiment.

Looking now to FIGS. 3A-3B, a display unit 300 is shown according to various embodiments. As an option, the present display unit 300 may be implemented in conjunction with features from any other embodiment listed herein, such as those described with reference to the other FIGS. However, such display unit 300 and others presented herein may be used in various applications and/or in permutations which may or may not be specifically described in the illustrative embodiments listed herein. Further, the display unit 300 presented herein may be used in any desired environment. Thus FIG. 3 (and the other FIGS.) may be deemed to include any possible permutation.

The display unit 300 may be configured to output any information described herein on a display 302 thereof.

According to some approaches, a display unit 300 may be a shelf and end cap display unit. The display unit 300 may include (e.g., be powered using) one or more batteries which may be rechargeable, thereby allowing for additional replacement batteries to be available. However, in other approaches, display units may be powered using cables, electrified shelving tracks, wireless charging (e.g., inductive charging), etc. Display unit 300 is preferably powered by a low voltage. Thus, a low power charged shelving sleeve may be implemented to power the display unit 300. Moreover, the display unit 300 may be made using plastic, metal, composites, etc.

The store shelf to which the display unit 300 is mounted may have a curved track which may be configured to snap the display unit into. For example, the display unit may be shelf clip that is pinched to secure with the track. However, a display unit may couple to the track using friction, tabs, Velcro, etc., or in any conventional manner of coupling. In some approaches, this may depend on the size of the display unit. For example, display units may be larger at the end of aisles in a store. Moreover, a track may have more than one display unit coupled thereto.

Figure 4:
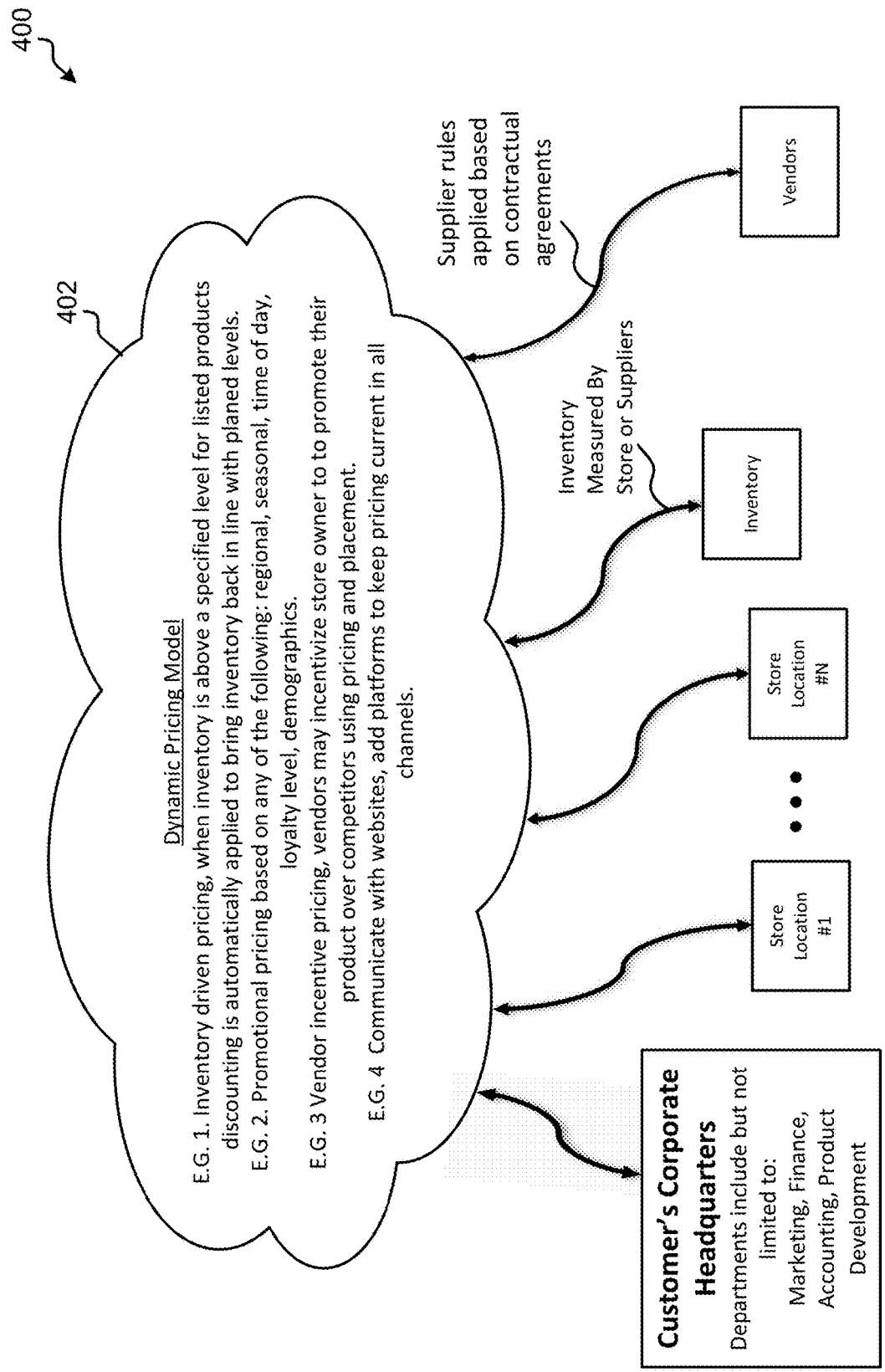
FIG. 4 is a partial representational view of a network according to one embodiment.

Looking now to FIG. 4, a network 400 is shown in accordance with one embodiment. As an option, the present network 400 may be implemented in conjunction with features from any other embodiment listed herein, such as those described with reference to the other FIGS. However, such network 400 and others presented herein may be used in various applications and/or in permutations which may or may not be specifically described in the illustrative embodiments listed herein. Further, the network 400 presented herein may be used in any desired environment. Thus FIG. 4 (and the other FIGS.) may be deemed to include any possible permutation.

Multiple devices may be in a given store, while multiple stores may be included in a given corporation. Accordingly, a local server may be replicated across stores (e.g., "Store Location #1" through "Store Location #N") and then connected to the corresponding corporation (e.g., "Customer's Corporate Headquarters"). As alluded to above, if information corresponding to a product is changed, e.g., at the corporate level, it is preferably made available to all relevant levels of the network 400, including an inventory management location "Inventory" and/or vendor locations "Vendors". As shown, inventory may be measured by stores themselves (e.g., individuals, computing programs, inventory management systems, etc. implemented at the stores) or by suppliers of the inventory. Moreover, communications between the vendors and the various locations connected to network 402 may be based on preexisting contractual agreements which may be implemented by the network. An exemplary dynamic pricing model is listed in network 402 of FIG. 4 which may be implemented in any of the approached described herein as would be appreciated by one skilled in the art after reading the present description.

For example, the corporate level may change the price of a product. The updated price is then preferably sent to all store locations, e.g., using an internet connection, a connection to a network (e.g., 402 of FIG. 4) and/or sent to a store wireless network directly which is coupled to various display devices. This may allow for inventory accounting to become nearly real time interactive, which may also allow for pricing to be more accurately based on inventory. For example, if it is determined that a given location has an excess amount of a given product, e.g., a type of cookie, that wasn't selling, that location may change, e.g., lower, the price on that type of cookie for a period of time, e.g., until the inventory balances out and the price may return to its normal value. Various other options are also available in terms of dynamic things available for inventory pricing. For example, short term sales may be enacted for specific demographic audiences, e.g., such as senior citizens. Demographic audiences may be characterized as individuals that frequent a store on particular days at particular times. Therefore, short term sales may be directed to a demographic audience at the location and time they most often visit the store. For example, a sale may target customers who regularly visit the store on Wednesday at 2 pm. In other approaches, a sale may use information associated with a demographic to attempt to transition the traffic of a demographic to another day and/or time of the week.

Demographics information about store customers may be determined using information gathered from loyalty card use, smartphone application use, user input, etc. Thus, although inventory of a product may be one reason that it may be desired to promote the sale a particular product (incentivized sale), the poll may serve as another reason. Information known about customer behavior may be used to modify pricing dynamically and/or on a temporal basis, e.g., at given points in time, e.g., if the customer behavior is properly understood. For example, if moms frequently shop on a Tuesday morning because their kids are in school, this information may be used to deduce that kids products which would be purchased by parents would be purchased at that time. Thus, advertising for that type of item may be spurred at that time in an attempt to influence that user to make a purchase in real time. This information may be gathered from the use of loyalty cards.

However, this may also depend on the inventory of a given product, and how the product would essentially be communicated with the inventory system, a corresponding database, a warehouse, staff who are scanning products on the shelves, etc. Therefore, in existing implementations, a person ultimately still has to physically determine how many units are on the shelf at the end of the day. In sharp contrast, some of the embodiments described herein enable connection between a point of sale unit and the inventory. Previously this has not been possible, as many previous systems had employees scan products as they are being put onto the shelves each week to determine the location that a particular product has been stored. Then when an item is checked out, it is being scanned to indicate that it has been removed from inventory.

However, it should be noted that some of the embodiments described herein may be integrated with existing product management systems. For example, any of the approaches described herein may be integrated with hand scanners, but in the backend the software can tie together. Thus, systems may be tied together to have them be useful that they would display differently depending on inventory.

In some approaches, certain situations may trigger price changes, e.g., such as a sufficiently low or high inventory. For example, if the inventory indicates that a certain product is at 20% of an ideal stock amount, the price of that product may be increased or decreased as desired. Moreover, reorders may be initiated based on this information as well.

Figure 5B:
FIG. 5B is a representational view of a mobile phone displaying a message to a user according to one embodiment.
Figure 5A:
FIG. 5A is a representational view of a mobile phone displaying a message to a user according to one embodiment.

Looking now to FIGS. 5A-5B, a mobile phone 500 running a mobile application is depicted in accordance with one embodiment. As an option, the present mobile phone 500 may be implemented in conjunction with features from any other embodiment listed herein, such as those described with reference to the other FIGS. However, such mobile phone 500 and others presented herein may be used in various applications and/or in permutations which may or may not be specifically described in the illustrative embodiments listed herein. Further, the mobile phone 500 presented herein may be used in any desired environment. Thus FIGS. 5A-5B (and the other FIGS.) may be deemed to include any possible permutation.

The mobile application being run on the mobile phone 500 of FIGS. 5A-5B may be a part of and/or compatible with the product management and pricing display system described in any of the approaches included herein. Information from the mobile application may provide demographics information. For example, the mobile application being run on the mobile phone 500 may implement geographical "fencing" which is able to detect when the owner of the mobile phone (e.g., customer) is physically in the store. The mobile application being run on the mobile phone 500 may also be able to implement loyalty and/or shopping history associated with the customer to suggest a list of potential purchases, currently promoted products which specific brands may pay fees for advertisement placement, remote shopping and/or home delivery options, the option to gain loyalty points for using remote shopping (e.g., to reduce store crowds during certain times of the week, day, year, etc.), accept special offers, etc. Two exemplary messages directed to a user (e.g., owner) of the phone are displayed on the screen of the mobile phone 500 in FIGS. 5A and 5B, which are in no way intended to limit the invention, but rather are presented by way of example.

Moreover, mobile (smartphone) applications (Apps) may be used to manage the inventory system, e.g., using interaction at the shelf. Thus, an application may start to drive the inventory instead of the old legacy systems. According to an example, an App may determine that a user is in the store. The App may also know what a customer normally buys, so it may populate a list of potential or past purchases. Then as the user travels down the aisles in the store that they normally have in the past, the user may actually experience an integration of inventory. For example, a person may use their mobile phone/device and scan something on the shelf before placing it into their cart, e.g., by taking a picture of the UPC code. This action performed by the user may provide communication to the store system updating the inventory system with quantity remaining on the shelf, thereby effectively replacing the normal inventory system, or supplementing the normal inventory system, thereby providing real-time feedback of inventory on the shelf. This provides a timelier snapshot of how many of a given product remain on a shelf, rather than waiting until checkout to update the inventory system. An alert may be provided to store staff with the inventory level and/or to restock the shelf.

This action could additionally create a checkout ready list on the customer's mobile phone/device. Such list may be used for automatic checkout using stored customer financial information, e.g., a credit card on file.

At some of the stores, a sale inventory connection may include audio and/or visual components which may be configured such that a larger display (relative to the customers' respective mobile devices) is made available to customers in the store. Once the larger display is activated (e.g., initiated), an audio, video, etc., advertisement recording may play. Thus, the in-store display units may show the regular pricing for certain items on the shelf, but other display units may also show ads for specials, e.g., running at the end caps of the aisles and that could be promoted by the individual manufacturer.

Approaches described herein may also include integration with online coupons, e.g., based on the price. In other words, coupons obtained online, in the mail, etc., could potentially influence the price shown on any of the display units. For example, a customer who buys a particular product every week may receive a coupon for that item which may then be used to override the price shown at a display unit, e.g., by scanning a code, which would again incentivize purchase. For example, the display unit may show a price of $4.99 for the product, but a customer's coupon may change that price to $4.50 or $4.00. Thus, a customer may visualize their savings before getting to the register. Previously, customers have had to wait to hear their savings until after the fact. However, by allowing the customer to see the amount they are saving for each item at the shelf, now the customer is being incentivized to put the item in their cart and ultimately buy it, e.g., by linking the store's management system to customers' online profile for that store. Today, nothing in the shopping experience is personalized. Some stores employ a loyalty number, but they don't really do anything with it besides at the register to tell a customer how much of a discount they received.

Apps, according to the various embodiments described herein, may first recognize a customer is in the store, e.g., using the global positioning system (GPS). Thus, a past purchase history for that customer may be accessed and may essentially populate their shopping list based on their previous purchase history. This may be done by flagging certain items, not just flagging items historically bought by the customer, but also flagging which ones of those items that are on sale right now. For example, a customer may always buy 17 items but only 5 are on sale, the customer may be incentivized to buy those 5 items on sale and come back for the other items on Friday because they know they will be on sale closer to the weekend.

Figure 6:
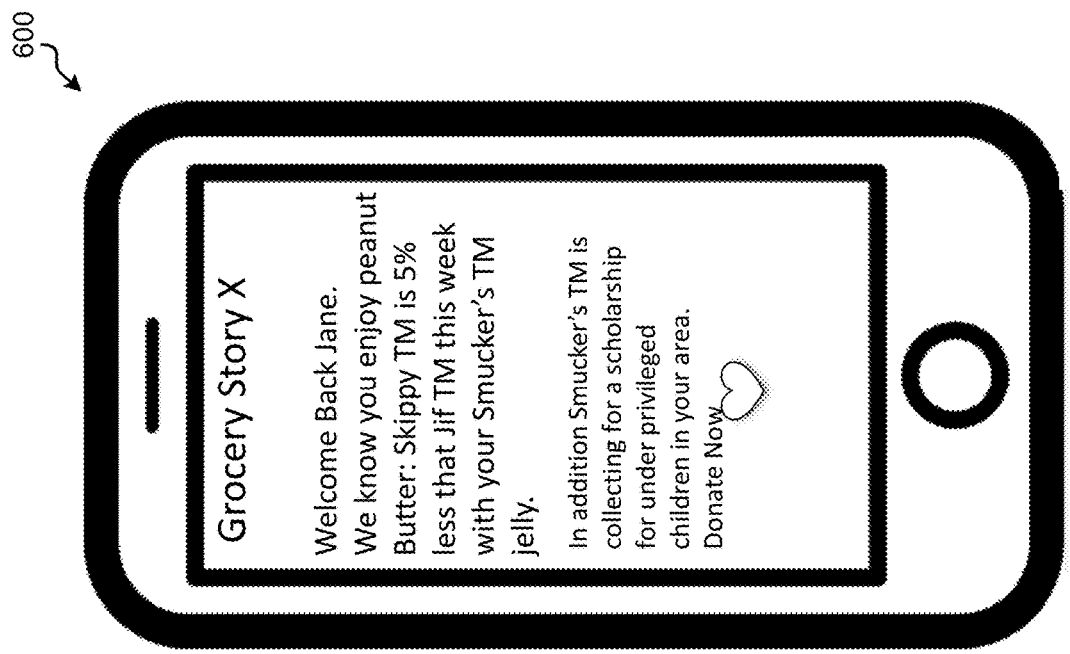
FIG. 6 is a representational view of a mobile phone displaying a message to a user according to one embodiment.

Referring now to FIG. 6, another mobile device 600 displaying vendor services and co-marketing opportunities is depicted in accordance with one embodiment. As an option, the present mobile device 600 may be implemented in conjunction with features from any other embodiment listed herein, such as those described with reference to the other FIGS. However, such mobile device 600 and others presented herein may be used in various applications and/or in permutations which may or may not be specifically described in the illustrative embodiments listed herein. Further, the mobile device 600 presented herein may be used in any desired environment. Thus FIG. 6 (and the other FIGS.) may be deemed to include any possible permutation.

As shown, the mobile device 600 provides a platform (e.g., medium) which is able to display vendor services, and generate and/or output co-marketing opportunities, such as: a promotional offer, creating product and/or promotional bundles, upselling inside a given product bundle to a premier brand, ingest social graph data to allow marketing to customers based on their preferences and brand affiliations in their social graph, etc., depending on the desired approach. An exemplary message directed to a user (e.g., owner) of the phone is displayed on the screen of the mobile phone 600 in order to display vendor services and/or co-marketing opportunities. However, it should be noted that the specific message displayed on the mobile phone 600 is in no way intended to limit the invention, but rather are presented by way of example. Moreover, which vendor services and/or co-marketing opportunities are generated and/or output may be based on buying behaviors captured by the App, and in turn generated by the App and/or fed back into the Product Management & Pricing system.

Apps may also be used to implement preferential information, e.g., from the vendor. For example, a customer may walk into the store, and their normal list of items may populate. Additionally, the App may create bundles of products which typically go with the items a customer is likely to buy, and give a deal on those bundles. For instance, a customer may typically buy crackers, so the App may generate a bundle of other items one may normally buy with crackers, e.g., such as cheese, salami, etc. In other applications, the App may notify customers of different brands of crackers that are on sale, despite the customer usually buying a specific brand. Moreover, the alternative brands may pay additional money to have their brand showcased as alternative options compared against the customers "normal" list.

And this information may be available while the customer is in the store. In sharp contrast, today when a customer is in the store buying a particular item, e.g., such as cat litter, when they are at checkout, they receive a coupon for a similar product, such as cat food. However, by this point, the customer is leaving and is not likely to go back into the store to use the coupon, thereby losing the potential additional business. Alternatively, the embodiments herein provide customers with the sales opportunities while still in the store, thereby incentivizing additional purchases which in turn increases revenue for the store.

In some approaches, interaction between partners may be enabled. For example, stores often ask customers to donate to a cause, e.g., such as cancer research, but as the customer is checking out and paying for their items. However, affiliation information may be displayed in the App as the customer is traveling through the store, that information may be re-associated with different parts of the store. For example, when a customer in the vegetable aisle, the App could be promoting a charity which are associated with living a healthy lifestyle. For example, a medical foundation may partner with a supermarket to promote healthy eating. The medical foundation may pay the supermarket to have an ad for people who are shopping in the vegetable aisle. Thus, the medical foundation may be promoting heart health on certain products if the customer is in an area of the store that may be used to incentivize them to eat healthy. Thus, promoting increase volume growth for the supermarket may be achieved. Also, the supermarket would have a respected health organization validating the healthiness of a product, thereby spurring customers with the idea that it is a healthy product along with the added incentive of having a medical foundation reminding them to eat more greens.

Essentially, as a customer moves around the store, if particular vendors have paid to promote their ad, it may appear in the App. According to another example, as a customer moves into the beer aisle, there may be a plurality of different beers. Thus, certain companies may pay to have their product(s) highlighted on the App to increase attention and likelihood of spurring a sale. Moreover, the App may be able to implement donations, links, and advertising within the App. Similarly, store brand replacement options may be suggested in the App. And these different promotion options may be implemented granularly. For instance, a company may not wish to advertise to everyone, but rather only to people who usually buy the type of products their company sells. For example, product companies don't want to spend money on delivering a targeted beer ad to flash up on the App of someone who has never bought alcohol at the supermarket.

Again, advertising may be targeted based on what part of the store a customer is in, and/or what is included on the customer's normal list of historical purchases. For example, when a customer enters a store, the store's App may generate a list of the customer's common purchases which is displayed on the customer's phone, which may remind the customer of things they need, spur them to buy something they like, etc. This may also be used to incentivize the customer to buy a certain brand of the product they wish to buy, e.g., by displaying sale pricing and/or promotions. According to an example, when a customer first enters a store, the store's App may display a window which reads "Welcome back, here is your normal list of items." But as the customer moves around the store, the App may also display ads based on where the customer is in the store and what type of products are displayed there. For example, targeted ads from the store's partners such as medical foundations may be displayed when in the vegetable section of a supermarket, e.g., as mentioned above. Thus, the capability that a particular product appears on a customer's App may be because the customer is in a corresponding part of the store, and/or because the item is on their normal list of purchases.

However, in some approaches it may be desirable to give customers more general information than information which is only relative to the aisle in which a product is located. Some stores may want to focus their investment on the App being run on customers' mobile devices itself, rather than on local infrastructure in the store. Some stores may be able to justify the investment of including improved physical display units as described herein and installing them. However, it may not be practical to GPS map every square foot of their store, so the App is able to determine when someone is in a given aisle. Thus, the detail available in the App may depend on the functionality a store desires and/or the amount of money they are willing to invest on achieving that functionality.

Moreover, stores may be able to gradually evolve connection to their customers, e.g., via their App. Functionality may evolve from kind of dynamic pricing and inventory related pricing on the shelf, to a personalized shopping experience. It follows that manufacturers may pay for promotions, loyalty sales, previous purchase affiliations, etc. This may be used to help sell a more expensive version of the same product.

Thinking about the end customer going in to a store, the customer may be going to get a better price on a product, which is going to motivate the customer to use the App. The store may also be able to afford to sell the product at a lower price because it is getting ad revenue from the manufacturer of the product. Currently, the manufacturer does that by giving a discount to the store, so now the manufacturer is paying the store to be preferential. The embodiments described herein may implement the reverse of this existing model. Currently, stores have a couple of issues, one of which is the use of paper labels that are very costly and which require a lot of labor to implement and update. Printing is also expensive. At the corporate level, product pricing is determined and transmitted to the store locations, which is then printed out on paper labels at the store, which are then physically being placed on the shelf at each corresponding item by high cost manual labor. However, pricing changes every week, or even more frequently. If it is a holiday, Memorial Day weekend for example, the corporate level may change pricing on a number of items a couple of times in a single week. Thus, existing models cost stores a significant amount of money.

In sharp contrast, the embodiments described herein provide significant improvements over existing systems. Although upfront costs (initial investment) may be associated with applying any of the embodiments described herein to existing systems, the resulting system will be more cost effective than what is currently employed, largely in view of the labor costs that will be reduced. Moreover, embodiments may be applied in phases. For example, a store may implement display units as described herein in a first phase, while the second phase may include introducing added interactivity and connectivity with the store's App. A third phase may further include introducing an augmented reality way of interacting with the App. According to an example, a store may provide instructional manuals with their products, e.g., for assembly. The instruction manuals may include icons with a picture, and if a customer hovers their phone over the icons (e.g., points their phone's camera at the icons) with the store's App open, the App will play a video of the parts included in that step and how to assemble them. In other words, the App provides step-by-step instructions to the customer visually, e.g., which may be done by actually showing someone building it. In another example, a customer may be able to hover their phone over portions of the store's brochure whereby an image of what the item would look like may appear on a customer's phone in the App, e.g., with open drawers, with optional features, positioned in a room with the different configurations, etc.

This functionality may further be developed to display all product information associated with a given item at the grocery store when a customer hovers their phone over a unique identifier (e.g., QR code, RFID tag, bar code, etc.) presented on or near the item on the shelf. In some approaches, this information may be displayed by pointing the camera at a product itself and having the App recognize the identity of the item by the item's shape, color, label, etc. In other approaches, augmented reality may be used for advertising purposes by the companies who make the particular product being examined by a customer. For instance, in addition to displaying the product information associated with a product on the App after scanning a code, an advertisement for the product may play, a salesperson may appear and give a recorded video pitch, etc., depending on the desired embodiment.

This ability may be built into a store's App, so that when a customer opens the App and hovers over a bottle of ketchup for example, the App may display the geographical location of the store, a size of the product, the price associated with it, whether there are any sales associated with this item, etc., and/or any of the other information described herein. This may further enable a customer to check themselves out (pay the store for their items) as they shop, thereby shortening checkout lines, delays, efficiency of the store overall, etc. For example, a customer may snap a code corresponding to a product before placing one or more of the products in their cart. Thus, a customer is able to essentially check out before returning to the front of the store.

Figure 7:
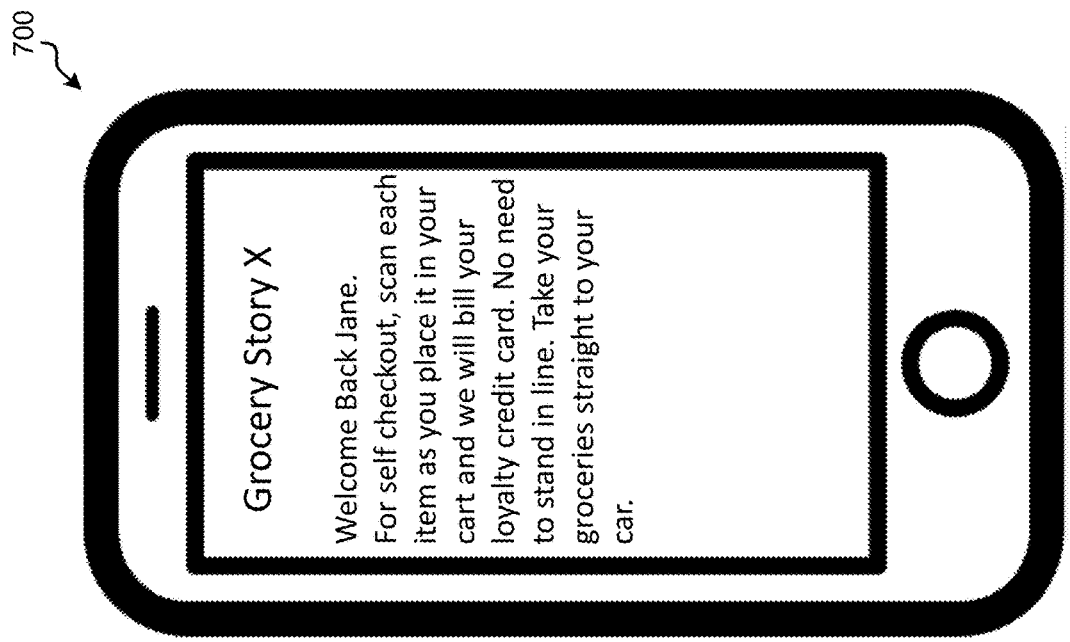
FIG. 7 is a representational view of a mobile phone displaying a message to a user according to one embodiment.

Referring now to FIG. 7, another mobile device 700 displaying a self-checkout function is depicted in accordance with one embodiment. As an option, the present mobile device 700 may be implemented in conjunction with features from any other embodiment listed herein, such as those described with reference to the other FIGS. However, such mobile device 700 and others presented herein may be used in various applications and/or in permutations which may or may not be specifically described in the illustrative embodiments listed herein. Further, the mobile device 700 presented herein may be used in any desired environment. Thus FIG. 7 (and the other FIGS.) may be deemed to include any possible permutation.

As shown, the mobile device 700 provides a platform (e.g., medium) which is able to display a self-checkout option, thereby providing a user with self-checkout capability. According to an example, a mobile device may provide a user the scanning capability to manage inventory and create a self-checkout option. This would reduce inventory and labor costs associated with selling the products the customer is attempting to purchase. An exemplary message directed to a user (e.g., owner) of the phone is displayed on the screen of the mobile phone 700 in order to display vendor services and/or co-marketing opportunities. However, it should be noted that the specific message displayed on the mobile phone 700 is in no way intended to limit the invention, but rather are presented by way of example.

This functionality may further be integrated with a form of payment. For example, any form of electronic payment, e.g., Apple Pay, Google Pay, Samsung Pay, etc. may be used. In other approaches, the App may be used to pay for all the items a customer desires, whereby a customer may arrive at the store to pick up a bag with the items they have purchased. Customers may pack their own bags in other approaches. Moreover, a receipt can be sent to customers via the App on their phone. In other approaches, a customer may walk around the store and scan items they wish to purchase, and as they continue to shop, a store employee actually goes around and picks up the items a customer has scanned and checks them out for the customer. In still further approaches, any of the approaches described herein may be integrated with home delivery options.

Many stores that have both online and offline presence would significantly benefit from the ability to figure out how they may be able to utilize information associated with purchases made in the physical store, and attribute those purchase back to the online platform for customers. For many companies, a majority (e.g., about 95%) of their revenue comes from brick and mortar sales, while only a minority (e.g., about 5%) is from online sales. Thus, if product sales and/or management systems, e.g., such as any of those described herein, are able to increase online sales, they may extend the budgets companies are willing to invest on online ads, App development, website building, etc. Thus, the combination of the online simple cookie system where a company knows someone is returning to a website, may be used to identify a returning visitor. If the returning visitor logs in and/or they respond to an ad, a company may send them an ad anonymously. When customers log in, respond to a specific email, purchase in store and register the product online, etc., a company may be able to link those actions together, thereby helping create an Omni Channel experience. Access to this multi-level consumer behavior may significantly affect investment in the customer. Integration across systems enables stores the ability to change the loyalty pattern of that user.

To expand on the approaches discussed above with regard to pricing, approaches like Peak Pricing and/or Congestion Pricing may be implemented. For example, on a Saturday night, between 8 pm and 12 pm, the pricing for alcohol may be raised to follow the increase in demand. That is a reaction to limited capacity. The other idea behind Peak Pricing idea involves questioning what would happen if demand is spread out, even though capacity may be fixed. For example, two days before St. Patrick's Day, a store may anticipate that everyone is going to be buying corned beef, cabbage, Irish whiskey and beer. Thus, a store may attempt to extend a purchase period a few more days before St. Patrick's Day, so people buy 3 or 4 days before St. Patrick's Day rather than 1 or 2. This may be done by selective advertising. For example, a month before St. Patrick's Day, a store may inform customers that if they buy certain items 5 days before St. Patrick's Day they get a 50% discount, 4 days before St. Patrick's Day they get a 20% discount, 3 days before St. Patrick's Day they get a 15% discount, and 2 days before St. Patrick's Day they get a 5% discount. Moreover, the night before St. Patrick's Day, the store may increase the prices of certain products significantly to cover the discounting offered leading up to St. Patrick's Day. This allows the store to get more people to buy items, and if the store structures their pricing properly, their net gain may be significantly higher because they used the big discount to drag people into the store who would not have purchased until right before or may not have purchased at all. If the customer leaves it for the last minute there is only so much that can be placed in the store and purchased.

Moreover, this pricing scheme may be dynamically applied instantaneously using the store's App or display units as described herein. Given currently existing models, stores are not attempting these types of promotions because they would have to print the ad, print price labels, and create in store signage. Alternatively, this could become a simple process utilizing notification in the app and presentation on the in-store displays. Moreover, by programming the pricing scheme to the store's system ahead of time, application and execution may be done much more smoothly than on a customer by customer basis. In some approaches, there may be dynamic reactivity built into the system, so that an inventory of a particular product may directly and possibly automatically affect the price thereof. For example, when inventory of an item is low, the store may know that it will not be able to ship restocks of that item in time to accommodate the demand, and may therefore adopt the idea of why not make as much profit as possible from what is left on the shelf.

It all becomes interconnected. The fact that a company is able to reflect this information at least somewhat immediately makes this interconnection possible. Moreover, the idea that a large amount of stores' revenue comes at or around certain times of year is an important factor. Stores experience "pinch periods" when companies are making a high percentage of profit on the products they sell, but the stores don't know how to extend that profit and level out their seasonality. With this type of dynamic approach as described herein, stores may be able to drag some of that increased revenue out of these pinch period (e.g., peak periods), which will in turn level out customers' purchasing and allow stores to sell much more product for a longer period of time because there is only so much the store is able to put on a shelf the week before a pinch period such as Christmas. Also, the store is only able to replace the products that have been purchased so quickly. If the store could just find a way to give the customers those promotions in an App where customers are sitting on the couch at Thanksgiving, and realize that their Christmas shopping list just popped up, thereby incentivizing customers to get out and begin pre-purchasing for Christmas. Thus, the approaches described herein may also allow stores to achieve more customers than by allowing sales to clump up those last few weeks or days before a holiday or other high sale period.

In order to implement any of the approaches described herein, any desired number of layers of systems may be applied. In one approach, at the back end there may be the kind of CRM and inventory systems which may be interacted with. In other approaches, ecommerce systems which run a company's business for them online (e.g., such as NetSuite) may be implemented. Further still, there are the front end systems, e.g., which include the company website and/or the Apps. Data may flow through all of these systems. Thus, it is desirable to detect an App that is preferably able to interact with all of these systems. For example, interoperability code may be written to make this happen with all these systems.

In one approach, this may be achieved by taking an App architecture and designing, customizing, applying, etc. it to the company's particular environment. For example, a company's App may be designed such that it connects into an ecommerce system as well as software programs. Moreover, this is preferably offered as a service. For instance, a company may have a functioning App, but they may also have their own cloud based system from which data may be extracted out of the company's different systems and power the App. Thus, by providing an App interface, and application programming interface (API) into a company's different systems, they may achieve functionality.

According to one embodiment, a company may have an inventory system. Thus, an API may interact with the inventory system and prompts the App to call that system to verify inventory may be beneficial. The company may not even verify their back-end system in some approaches. In one example, a call may determine "Ketchup, San Jose, Store X, Inventory". This may be a millisecond call to verify it, whereby the App may be used to verifying it.

Moreover, in terms of a company's marketing advertising system, they may send out millions of emails. Thus, an App preferably knows who those emails went to and what the price guarantee that was included in that email. This may be an API call to an advertising system, which may remind a customer that they received an email last week, and the promotion included therein is valid in the store today. In other words, a call to that system, verifying that a customer has already been promised a price in a previous communication email, and the store wants to always be able to validate it against anything the store has told that person previously.

Additionally, in the store a company may wish to determine what current pricing is in the store and whether any different pricing (e.g., sales) is available for certain customers when they enter the store. That could actually be achieved by a company's own dynamic pricing within the App in some approaches. For example, someone may make a call out which says in the stores in San Jose, ketchup is $2.50. Moreover, based on a customer's loyalty and/or history, the App may dynamically give that customer a 20% discount on that or other products. Accordingly, in some approaches, the App may be managing itself, but it is not contradicting what the store is doing otherwise, rather, it may be validating it. Finally, based on who the customer is and their history, they may receive something in return. The App may do all that because these are independent calls that the app is making, these may be millisecond calls that can happen in real time. Considering the shopping experience, a store typically has 20 minutes, a half hour, maybe 45 minutes for these communications to happen. It's not like a customer is sitting at a website where everything has to happen instantaneously. The customer actually has a shopping experience that the person is walking through, so the store may stagger these calls out to the other systems. In some approaches, the first call may be between GPS, the store and a loyalty server. For example, a customer may walk into the store, which may be recognized, e.g., by the store's App, by showing their loyalty card, etc. Based on that information the store may call back through its inventory system and/or promotion system, back through an email system, etc., and preferably updating the App as the customer is walking through the store. That reduces the threshold for communication. It doesn't have to happen in a bulk download to the customer's phone. The App is making multiple calls over a significant period of time. And that is important for network traffic, for responsiveness of the App on the phone.

Certain tasks may use more processing power than others. For example, processes associated with languages (e.g., translating between languages) are relatively easy and may be performed without creating much network traffic. However, other processes such as currency exchange, a relatively high level of processing power may be used, e.g., depending how an architecture system is set up. This includes interactions between country or region level currency, inventory management, regulatory restrictions regarding what may be sold, pricing, etc. In some instances, a separate server may be dedicated for use with each region, and the results may also be aggregated afterwards rather than in real time because currency converter tools are usually not used in real time. The problem is each transaction happens at a different time, so the currency conversion is different at every different second. Thus, if a system is reporting over a period of a month for 15 different countries, it may not be able to dynamically calculate the revenue and sale price was on every single transaction. Rather, everything may be normalized back to dollars for reporting purposes. For uses like this, it may be desirable to serve multiple regions out of one or more daily centers. For example, Mexico, US, and Canada may be processed out of the US, while another server in Amsterdam is used to serve Europe. Furthermore, some of Eastern Europe may be processed by a server in Japan, while another server in Australia is used to process South-East Asia and Australia. The architecture is preferably configured to perform heavy modeling and calculations a couple of times a day in the central server. However, the dynamic, real time calculations may also be happening in a specific region, preferably as close as possible the user. In one approach, a model is set up once a night, but the model has all of the information that the dynamic calls come in during the day can all be answered appropriately. But if a big inventory change occurs, that may only be done once a day. It depends how often inventory changes. In some instances, customers may request this functionality 4 times a day.

Although this system may be achieved using a Cloud model, it could also be implemented with an internal software model.

Implementation may first include creating an App in addition to two or three entities that lead to interaction virtually, thereby basically creating an inventory database. Thus, by going into the database and changing the price, the App may update, e.g., automatically. Thus, the App is communicating with an inventory system and it is dynamically reacting to it. Moreover, the App may be designed to function with a loyalty program, e.g., by building a shell of a loyalty program which is essentially another database which has customers and all of their information, e.g., all of their loyalty history, and the App can be connected to the inventory. For example, at a first pass, a system may have two people in the loyalty program. This does not translate to a large infrastructure, and therefore may be performed virtually on one laptop. The corresponding little databases may be established on the laptop, and a webpage may be set up to function as the App. This then can be used to demonstrate the App is talking to the systems and bring it back information. Thus, with relatively low materials, time and manpower, a web site version of a system as described herein may be built.

To establish an actual phone App would be more costly because now the App is designed to function on a phone and connect to databases that are virtual. Again, a call may be mocked up which determines that Customer A logs in, and then the App may just mirror what would come back from an actual system. Accordingly, there may be no back-end system associated, and then when Customer A logs in, the App may be populated with something pre-designed. That will serve as a proof of concept. As a result, an App on a phone is talking to virtual systems. Moreover, the next step may include having an App talk to real systems. At this point it may be desirable to have a first pilot customer, e.g., a company willing to test out a beta version of an App. This may include offering a perpetual license (no cost), to continue using the App if it works successfully.

The improvements achieved by implementing any one or more of the approaches described herein are extensive. For example, display units as described above are able to display prices of item, while also measuring quantities of items, various aspects of organization, expiration dates, etc. The also allow for customers to observe prices of goods associated therewith. Management is also able to make changes to the prices of items associated with various display units, whereby the information shown on the display units is changed instantly. In other approaches, changes may be programmed to occur when certain conditions are met, e.g., a specific time, date, inventory, etc. This increases the amount of time saved and money made between transitions of pricing while not invading physical aisles in stores to physically change pricing tags and prevent customers from purchasing products as is currently experienced. Embodiments described herein may also integrate with a phone App with a system which picks up patterns on preferred types of food/items. Brands are monitored all the way down to a specific item, thereby enabling management to recommend products accordingly.

According to an example, a customer is a mother with 2 boys who play sports and live in Arizona. Therefore, hydration will be an important aspect of the customer's shopping trends and she will likely purchase many beverages. To be more specific, she may buy sports drinks, and to be even more detailed, she may usually buy Gatorade. An App as described herein may be able to detect this pattern of beverage purchases and alert her when Gatorade is on sale, thereby making Gatorade an easy item to automatically add to her digital shopping list.

At another functioning level of an App, if a specific product has a more distanced relationship with the management of a corporation and will not give as many deals to the corporation (e.g., bulk pricing deals) than another similar product, the App may notify customers of the cheaper alternative product which is similar to the one they usually buy which may be more expensive on average. However, the App can also be structured so that a product company may pay management for other companies with similar products to not be advertised as heavily, e.g., such that their product remains a priority option on customers' shopping lists. Companies may also be able to pay for advertisement which will already be targeting their desired audience based on information the management already has acquired about their customers. Due to the increased level of information, the approaches described herein provide efficient placement of products, manual or automatic sales, and rises in pricing along with a convenient mobile system, thereby increasing ease when shopping at the management's store. This also increases revenue for advertising recommended products as well as keeping a list of all items currently on sale, and the ability to create a convenient shopping list for customers.

Presenting accurate and up-to-date pricing information is desirable. For instance, sale prices are preferably updated in a timely and accurate manner. Moreover, many stores change their pricing frequently to match the prices of competitors. Therefore, the approaches described herein provide a significant advantage to various companies.

According to some approaches, inventory levels may be entered into a store's existing inventory management software. The data may then be retrieved and analyzed against predefined limits that may be used to trigger predetermined sale prices automatically for specific products when quantities rise above or fall below those predetermined limits. Moreover, these automatic adjustments may be implemented by display units on the shelves automatically, thereby providing the customer with a real time and accurate understanding of a product's price. This may also be set for specific days and/or times to target specific customer populations, e.g., as described above.

Software may be used to ingest customer data (e.g., gathered from an App), inventory data, competitor pricing data, etc., and send resulting price changes to the individual display units using a wireless internet connection and/or via a LAN. Moreover, software may be enabled to accept multiple different formats as would be appreciated by one skilled in the art upon reading the present description.

These abilities are particularly desirable in view of the shortcomings of existing systems. For example, existing systems are not able to change the price of items displayed in stores instantaneously, even if shipments of materials are able to arrive at any desired time. This causes delay of information and slows business considerably. For example, if a parent company buys in bulk to save money on a given product, that product can only be distributed to stores that have a lack of that product, otherwise advertised pricing may not be able to adjust quickly enough in the store. Slow adjustment of pricing in comparison to the quicker purchasing rates that are possible causes clashes to occur in view of the time sensitive nature of some perishable items (e.g., food). Due to this, corporations miss out on large savings as they are unable to expel products fast enough with a beneficial sale because the pricing available does not properly represent the value of the products, and cannot be changed to do so quickly.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems.

One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

Figure 8:
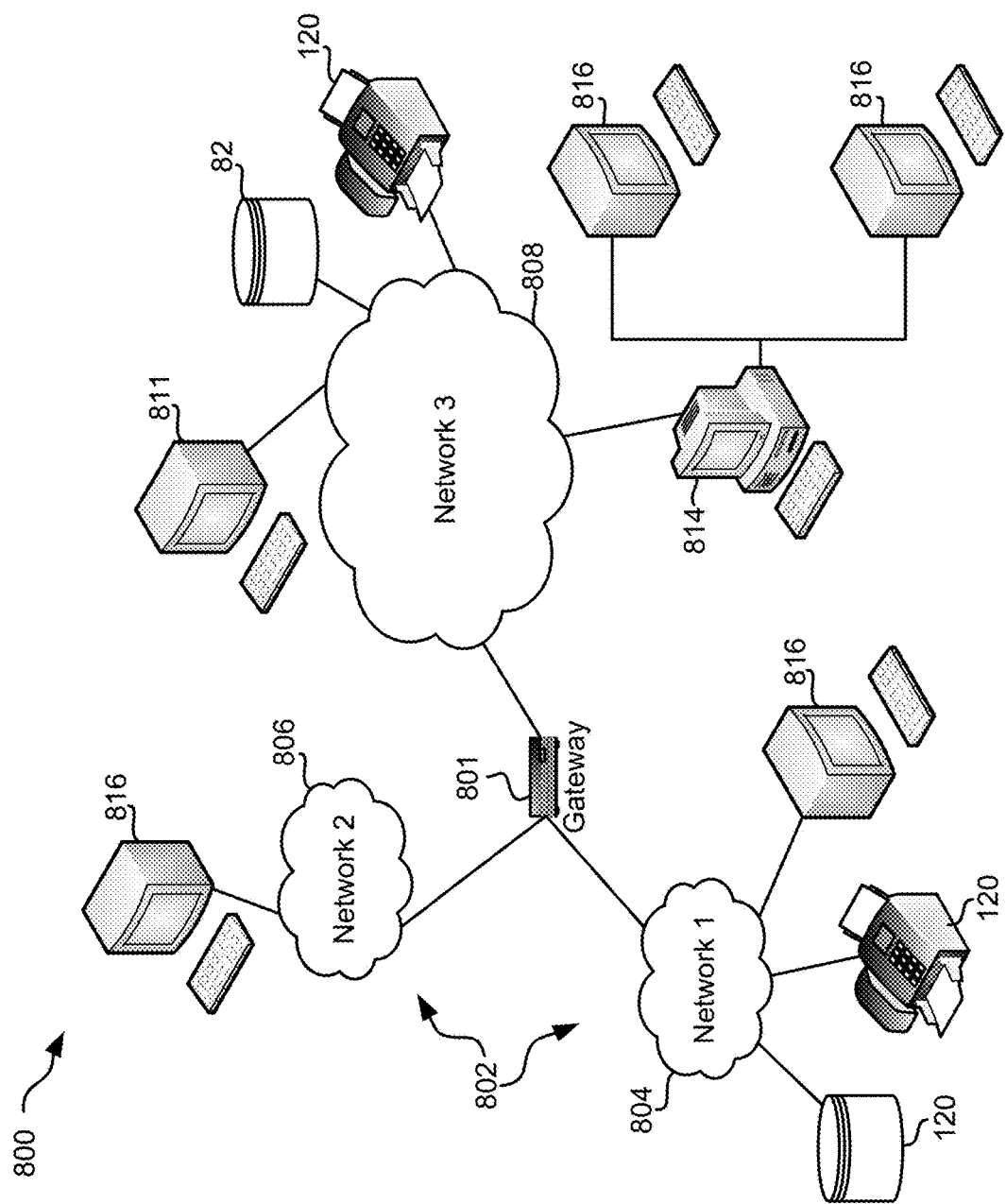
FIG. 8 illustrates an architecture, in accordance with one embodiment.

FIG. 8 illustrates an architecture 800, in accordance with one embodiment. As an option, the present architecture 800 may be implemented in conjunction with features from any other embodiment listed herein, such as those described with reference to the other FIGS. Of course, however, such architecture 800 and others presented herein may be used in various applications and/or in permutations which may or may not be specifically described in the illustrative embodiments listed herein. Further, the architecture 800 presented herein may be used in any desired environment.

As shown in FIG. 8, a plurality of remote networks 802 are provided including a first remote network 804 and a second remote network 806. A gateway 801 may be coupled between the remote networks 802 and a proximate network 808. In the context of the present network architecture 800, the networks 804, 806 may each take any form including, but not limited to a LAN, a WAN such as the Internet, public switched telephone network (PSTN), internal telephone network, etc.

In use, the gateway 801 serves as an entrance point from the remote networks 802 to the proximate network 808. As such, the gateway 801 may function as a router, which is capable of directing a given packet of data that arrives at the gateway 801, and a switch, which furnishes the actual path in and out of the gateway 801 for a given packet.

Further included is at least one data server 814 coupled to the proximate network 808, and which is accessible from the remote networks 802 via the gateway 801. It should be noted that the data server(s) 814 may include any type of computing device/groupware. Coupled to each data server 814 is a plurality of user devices 816. Such user devices 816 may include a desktop computer, laptop computer, hand-held computer, printer or any other type of logic. It should be noted that a user device 811 may also be directly coupled to any of the networks, in one embodiment.

A peripheral 820 or series of peripherals 820, e.g. display devices as disclosed herein, facsimile machines, printers, networked storage units, etc., may be coupled to one or more of the networks 804, 806, 808. It should be noted that databases, servers, and/or additional components may be utilized with, or integrated into, any type of network element coupled to the networks 804, 806, 808. In the context of the present description, a network element may refer to any component of a network.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of VMWARE software, in some embodiments.

In more approaches, one or more networks 804, 806, 808, may represent a cluster of systems commonly referred to as a "cloud." In cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high-speed connection (e.g., 4G LTE, fiber optic, etc.) between the systems operating in the cloud, but other techniques of connecting the systems may also be used.

Figure 9:
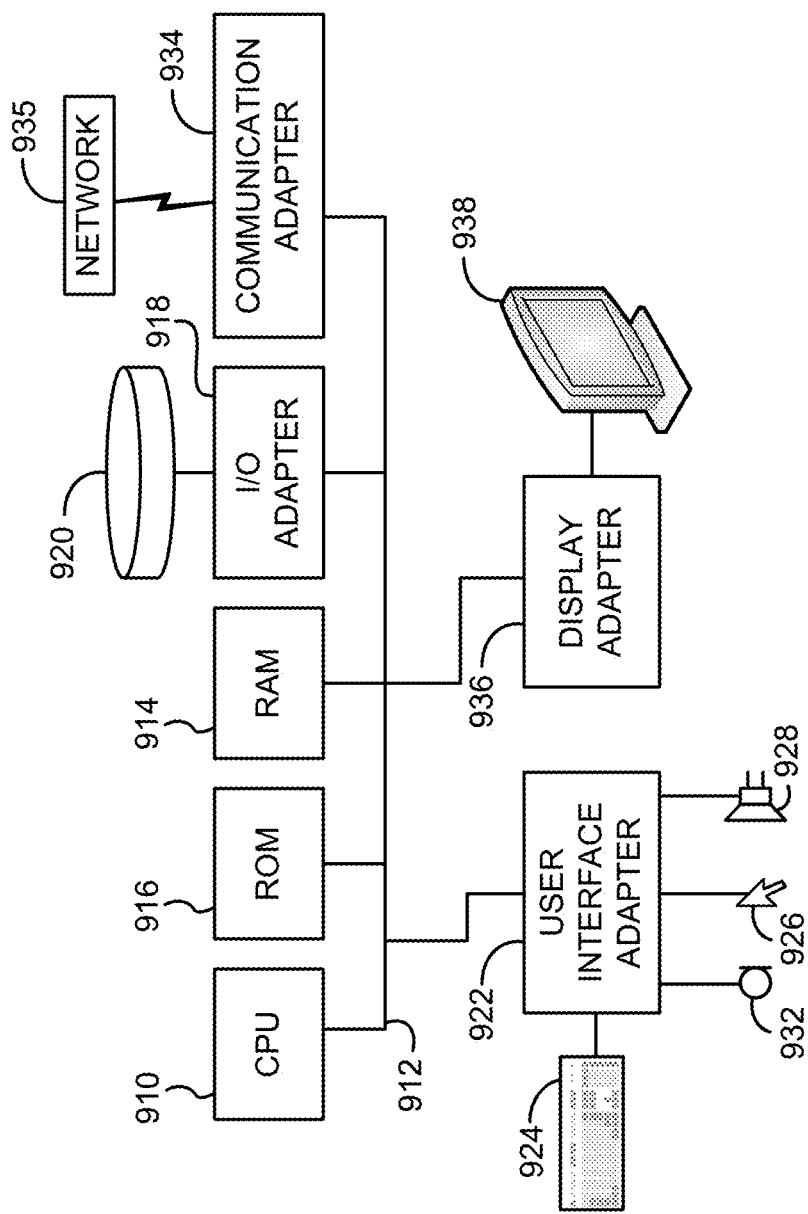
FIG. 9 shows a representative hardware environment associated with a user device and/or server, in accordance with one embodiment.

FIG. 9 shows a representative hardware environment associated with a user device 916 and/or server 914 of FIG. 8, in accordance with one embodiment. Such figure illustrates a typical hardware configuration of a workstation having a central processing unit 910, such as a microprocessor, and a number of other units interconnected via a system bus 912.

The workstation shown in FIG. 15 includes a Random Access Memory (RAM) 914, Read Only Memory (ROM) 916, an I/O adapter 918 for connecting peripheral devices such as disk storage units 920 to the bus 912, a user interface adapter 922 for connecting a keyboard 924, a mouse 926, a speaker 928, a microphone 932, and/or other user interface devices such as a touch screen and a digital camera (not shown) to the bus 912, communication adapter 934 for connecting the workstation to a communication network 935 (e.g., a data processing network) and a display adapter 936 for connecting the bus 912 to a display device 938.

The workstation may have resident thereon an operating system such as the Microsoft WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method, comprising:
receiving, by the computer, prices from a remote site via a network;
sending, by the computer, the prices to a plurality of locations, with an instruction to output the prices on displays of display units, wherein the plurality of locations are geographically distinct store locations;
receiving, by the computer, from the plurality of locations, inventory information about a product at the plurality of locations;
selecting, by the computer, a price for the product at each location individually based on the inventory information of each respective location, wherein the inventory information at each respective location is based at least in part on interactions between an inventory system and at least one user device associated with at least one user shopping at each respective location, wherein the interactions track which items in the inventory are removed from the inventory before a checkout process;

sending, by the computer, the selected prices to the respective locations with an instruction to output the respective selected price on a display of at least one of the display units at the respective location; and in response to detecting a change in the inventory information about the product at at least one of the locations, sending, by the computer, the original price to the at least one of the locations to output the original price on the display of the display unit at the respective location.

2. The method as recited in claim 1, comprising sending, for a product, by the computer, at least one additional piece of information for output on the displays of the display units, the at least one additional piece of information being selected from the group consisting of a name, size, a corresponding SKU number, special offers corresponding to the product, a scan code, measurements, sale flags, address, and unit identification (ID); wherein the items in the inventory which are removed from the inventory before a checkout process form a checkout ready list for automatic checkout.

3. The method as recited in claim 1, comprising:
receiving, by the computer, a notification of relocation of one of the display units;
determining, by the computer, a new location of the display unit;
selecting, by the computer, a new price based on the new location; and
sending, by the computer, the new price to the relocated display unit with an instruction to output the new price.

4. The method as recited in claim 1, comprising:
receiving, by the computer, from the plurality of locations, inventory information about products at the plurality of locations;
sending, by the computer, the inventory information to vendors of the products;
receiving, by the computer, from the vendors, content for outputting on displays of the display units; and
sending, by the computer, the content to the plurality of locations with an instruction to output the content on the displays of the display units.

5. The method as recited in claim 1, comprising:
receiving, by the computer, from the plurality of locations, inventory information about products at the plurality of locations; and sending the inventory information to the remote site.

6. The method as recited in claim 1, comprising:
receiving, by the computer, from the plurality of locations, demographics information about customers visiting the plurality of locations;
selecting, by the computer, advertisements for each of the locations individually based on the demographics information of each respective location; and
sending, by the computer, the advertisements to the respective locations with an instruction to output the respective advertisements on the displays of the display units at the respective locations.

7. The method as recited in claim 1, comprising:
compiling, by the computer, inventory information about products at each of the locations;
sending, by the computer, the inventory information to the remote site;

receiving, by the computer, content from the remote site for outputting on the displays of the display units; and
sending, by the computer, the content to the plurality of locations with an instruction to output the content on the displays of the display units.

8. The method as recited in claim 1, comprising:
receiving, by the computer, information associated with a user from a mobile application running on a mobile device of a customer;
selecting, by the computer, an advertisement for the user based on the received information; and
sending, by the computer, the advertisement to the mobile application for output on a display of the mobile device.

9. A computer-implemented method, comprising:
receiving, by the computer, prices from a remote site via a network;
sending, by the computer, the prices to a plurality of locations, with an instruction to output the prices on displays of display units;
receiving, by the computer, from the plurality of locations, demographics information about customers visiting the plurality of locations;
setting, by the computer, a price for a product at one of the locations differently than a price for the same product at a different one of the locations based on the demographics information; and
sending, by the computer, the set prices to the respective location with an instruction to output the respective price on displays of display units at the respective locations wherein the displays of the display units are configured to display interchangeable prices in response to relocation of the display units within each of the respective locations.

10. The method as recited in claim 9, wherein the prices are changed on a temporal basis based on the demographics information.

11. The method as recited in claim 9, wherein the prices are changed on a temporal basis based on a predefined daily schedule.

12. The method of claim 9, wherein the plurality of locations are geographically distinct store locations, wherein the display units are integrated within each of the distinct store locations.

13. The method of claim 9, wherein the demographics information is selected from the group consisting of: loyalty card use, smartphone application use, and user input, wherein the demographics information includes remote shopping information, wherein setting a price for the product at one of the locations differently than the price for the same product at a different one of the locations is based on least in part on the remote shopping information.

14. A computer-implemented method, comprising:
receiving, by the computer, prices from a remote site;
instructing, by the computer, display units at a plurality of locations to output the prices on displays thereof, wherein the plurality of locations are geographically distinct store locations;
compiling, by the computer, inventory information about products at the plurality of locations, wherein the inventory information at each respective location is based at least in part on interactions between an inventory system and at least one user device associated with at least one user shopping at each respective location, wherein the interactions track which items in the inventory are removed from the inventory before a checkout process;

sending, by the computer, the inventory information to vendors of the products;

receiving, by the computer, from the vendors a price for each of the products for outputting on the displays of the display units; and sending, by the computer, the price for each of the products to the plurality of locations with an instruction to output the price on at least one display of the display units; and in response to detecting a change in the inventory information about at least one the products at at least one of the locations, sending, by the computer, a sale price to the at least one of the locations to output the sale price on the at least one display of the display units at the respective location, wherein the change in the inventory information is detected at least in part in response to the interactions between the inventory system and the at least one user device.

15. The method as recited in claim 14, comprising:
detecting, by the computer, relocation of one of the display units;
sending, by the computer, a notification of the relocation;
receiving, by the computer, a new price from the remote site; and
sending, by the computer, the new price to the relocated display unit with an instruction to output the new price.

16. The method as recited in claim 14, comprising sending, by the computer, demographics information to the remote site.

17. The method as recited in claim 14, comprising receiving by the computer, identification of products from a mobile application running on a mobile device of a user; generating a list of the identified products; and sending the list to the mobile device for output thereon.

18. The method as recited in claim 14, comprising receiving by the computer, identification of products from a mobile application running on a mobile device of a user; and updating, by the computer, an inventory to remove the identified products from the inventory in response to receiving the identification of the products and the product is placed in customers cart in preparation for automated checkout.

19. The method of claim 16, wherein the demographics information is selected from the group consisting of: loyalty card use, smartphone application use, and user input, wherein the demographics information includes remote shopping information, wherein setting a price for the product at one of the locations differently than the price for the same product at a different one of the locations is based on least in part on the remote shopping information.

20. A display unit-implemented method, the display unit having a processor and a display, the display being configured to output information, the method comprising:

receiving, by the display unit, a price via a network from a remote site, wherein the remote site is a headquarters location associated with a plurality of store locations;

outputting, by the display unit, the price on the display of the display unit corresponding to a product located therebehind; determining, by the display unit, a location within a particular store location based at least in part on the display unit's position with respect to at least two products which are different than the product located therebehind;

detecting, by the display unit, relocation of the display unit within the particular store location based at least in part on the display unit's position with respect to least two other products which are different than the product located therebehind;

sending, by the display unit, a notification of the relocation; and receiving, by the display unit, a new price via the network, wherein the new price reflects a change in the product located therebehind; and outputting, by the display unit, the new price on the display of the display unit corresponding to the new product located therebehind.

21. A computer-implemented method, comprising:
receiving, by the computer, prices from a remote site;
sending, by the computer, the prices to a plurality of locations, wherein the plurality of locations are geographically distinct store locations, with an instruction to output the prices on displays of display units integrated within each of the distinct store locations;
receiving, by the computer, from the plurality of locations, demographics information about customers visiting each of the plurality of locations, wherein demographics information is selected from the group consisting of: loyalty card use, smartphone application use, and user input;
setting, by the computer, a price for a product at one of the locations differently than a price for the same product at a different one of the locations based on the demographics information associated with the one of the locations; and
sending, by the computer, the set prices to the respective location with an instruction to output the respective price on displays of display units at the respective locations wherein the displays of the display units are configured to display interchangeable prices in response to relocation of the display units within each of the respective locations.

* * * * *